United States Patent
Wielage et al.

(10) Patent No.: US 11,995,442 B2
(45) Date of Patent: May 28, 2024

(54) PROCESSOR HAVING A REGISTER FILE, PROCESSING UNIT, AND INSTRUCTION SEQUENCER, AND OPERABLE WITH AN INSTRUCTION SET HAVING VARIABLE LENGTH INSTRUCTIONS AND A TABLE THAT MAPS OPCODES TO REGISTER FILE ADDRESSES

(71) Applicant: NXP B.V., Eindhoven (NL)

(72) Inventors: Paul Wielage, Waalre (NL); Mathias Martinus van Ansem, Gemert-Bakel (NL); Jose de Jesus Pineda de Gyvez, Gilroy, CA (US); Hamed Fatemi, San Jose, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/658,356

(22) Filed: Apr. 7, 2022

(65) Prior Publication Data
US 2022/0342669 A1   Oct. 27, 2022

(30) Foreign Application Priority Data
Apr. 23, 2021   (EP) ..................................... 21170273

(51) Int. Cl.
*G06F 9/30* (2018.01)
(52) U.S. Cl.
CPC ...... *G06F 9/30185* (2013.01); *G06F 9/30101* (2013.01); *G06F 9/30145* (2013.01); *G06F 9/30149* (2013.01); *G06F 9/30152* (2013.01)
(58) Field of Classification Search
CPC ............... G06F 9/30101; G06F 9/3017; G06F 9/30174; G06F 9/30178; G06F 9/30149;
(Continued)

(56) References Cited

U.S. PATENT DOCUMENTS 5,450,555 A * 9/1995 Brown, III ............ G06F 9/3848
                                                              712/228
5,485,624 A * 1/1996 Steinmetz ........... G06F 9/30167
                                                              712/E9.067
(Continued)

FOREIGN PATENT DOCUMENTS

| CN | 109447241 A | 3/2019 |
| CN | 110516801 A | 11/2019 |
| CN | 108446761 B | 7/2021 |

OTHER PUBLICATIONS

Harris et al., Digital Design and Computer Architecture, 2007, Elsevier, First Edition, 561 pages (Year: 2007).*

*Primary Examiner* — Keith E Vicary (57) ABSTRACT

A processor includes a register file having a plurality of register file addresses, a processing unit, configured to perform processing in accordance with a configuration defined by information stored in the register file, and an instruction sequencer. The instruction sequencer is configured to control the processing unit by retrieving a sequence of instructions from a memory, in which each instruction includes an opcode, and a subset of the instructions includes a data portion. For each instruction in the sequence of instructions, the instruction sequencer performs an action defined by the opcode. The action for the subset of the opcodes includes writing the data portion to a register file address defined by the opcode. The sequence of instructions includes variable length instructions.

16 Claims, 4 Drawing Sheets

(58) Field of Classification Search
CPC ............ G06F 9/30152; G06F 9/30181; G06F 9/30185; G06F 9/30145
See application file for complete search history.

(56) References Cited

U.S. PATENT DOCUMENTS

| | | | |
|---|---|---|---|
| 5,537,620 A * | 7/1996 | Breternitz, Jr. | G06F 8/443 717/160 |
| 6,704,362 B2 * | 3/2004 | Peng | H04N 19/61 348/E5.006 |
| 6,807,626 B1 * | 10/2004 | Cofler | G06F 9/30145 712/213 |
| 6,842,844 B1 * | 1/2005 | Fadavi-Ardekani | H04M 11/062 725/111 |
| 7,376,814 B1 * | 5/2008 | Saville | G06F 9/30178 712/210 |
| 2002/0135502 A1 * | 9/2002 | Lu | H03M 13/6563 341/107 |
| 2003/0208674 A1 * | 11/2003 | Sih | G06F 9/3016 712/E9.023 |
| 2006/0143346 A1 | 6/2006 | Hollinger | |
| 2006/0253689 A1 * | 11/2006 | Knowles | G06F 9/30181 712/E9.035 |
| 2008/0316912 A1 * | 12/2008 | Al Adnani | H04L 27/0004 370/210 |
| 2009/0198966 A1 | 8/2009 | Gschwind et al. | |
| 2009/0261995 A1 * | 10/2009 | Sakaguchi | H03M 7/40 341/67 |
| 2015/0052332 A1 * | 2/2015 | Mortensen | G06F 15/7889 712/37 |
| 2017/0150175 A1 | 5/2017 | Rahman et al. | |
| 2018/0101384 A1 | 4/2018 | Keaveny et al. | |
| 2018/0300138 A1 | 10/2018 | Pineda de Gyvez et al. | |
| 2018/0350351 A1 | 12/2018 | Kopys et al. | |
| 2019/0042923 A1 | 2/2019 | Janedula et al. | |
| 2020/0090040 A1 | 3/2020 | Pineda De Gyvez et al. | |
| 2020/0341807 A1 | 10/2020 | Xu et al. | |

* cited by examiner

| 230 | | | | | |
|---|---|---|---|---|---|
| RF(23) = 0x0000392A ⎫ | | | | | |
| RF(39) = 0x00000000 ⎬ 231 | | | | | |
| RF(55) = 0x00003C9C ⎭ | | | | | |

| 250 | | | | |
|---|---|---|---|---|
| (A) | B | OC | DATA | WIDTH |
| (023) | 1 | 0x8 | 0x8000392A | 9 |
| (039) | 2 | 0x8 | 0xC0000000 | 9 |
| (055) | 3 | 0x8 | 0x40003C9C | 9 |
| (016) | 1 | 0x1 | 0x00060440 | 9 |
| (017) | 1 | 0x2 | 0x0000 | 5 |
| (018) | 1 | 0x3 | 0x000030 | 7 |
| (019) | 1 | 0x4 | 0x0C0000 | 7 |
| (015) | 1 | 0x0 | 0x5 | 2 |
| (016) | 1 | 0x1 | 0x0005C440 | 9 |
| (017) | 1 | 0x2 | 0x0019 | 5 |
| (019) | 1 | 0x4 | 0x0C0002 | 7 |
| (015) | 1 | 0x0 | 0x6 | 2 |
| (032) | 2 | 0x1 | 0x0065C000 | 9 |
| (033) | 2 | 0x2 | 0x0000 | 5 |
| (034) | 2 | 0x3 | 0x000000 | 7 |
| (035) | 2 | 0x4 | 0xCB8004 | 7 |
| (015) | 2 | 0x0 | 0x8 | 2 |
| (002) | 0 | 0x1 | 0x2802 | 5 |
| (003) | 0 | 0x2 | 0x00606 | 6 |
| (004) | 0 | 0x3 | 0x5B000B | 7 |
| (005) | 0 | 0x4 | 0x20800C00 | 9 |
| (006) | 0 | 0x5 | 0x00019 | 6 |
| (001) | 0 | 0x0 | 0x7 | 2 |
| (048) | 3 | 0x1 | 0x00058143 | 9 |
| (049) | 3 | 0x2 | 0x0000 | 5 |
| (050) | 3 | 0x3 | 0x011216 | 7 |
| (051) | 3 | 0x4 | 0x0B1049 | 7 |
| (015) | 3 | 0x0 | 0xC | 2 |
| (005) | 0 | 0x4 | 0x20833C00 | 9 |
| (001) | 0 | 0x0 | 0x7 | 2 |
| (056) | 3 | 0x9 | 0x114 | 4 |
| (015) | 3 | 0x0 | 0xC | 2 |

| | 250 | | | | 260 | | | | | | | | |
|---|---|---|---|---|---|---|---|---|---|---|---|---|---|
| (A) | B | OC | DATA | WIDTH | | | | | | | | | |
| (023) | 1 | 0x8 | 0x8000392A | 9 | 0 | 0 | 0 | 3 | 9 | 2 | A | 8 | |
| (039) | 2 | 0x8 | 0xC0000000 | 9 | 0 | 0 | 0 | 0 | 0 | 0 | 8 | 8 | |
| (055) | 3 | 0x8 | 0x40003C9C | 9 | 0 | 3 | C | 9 | C | 8 | C | 0 | 261 |
| (016) | 1 | 0x1 | 0x00060440 | 9 | 0 | 4 | 4 | 0 | 1 | 4 | 0 | 0 | |
| (017) | 1 | 0x2 | 0x0000 | 5 | 0 | 0 | 0 | 2 | 0 | 0 | 0 | 6 | |
| (018) | 1 | 0x3 | 0x000030 | 7 | 0 | 0 | 0 | 0 | 3 | 0 | 3 | 0 | |
| (019) | 1 | 0x4 | 0x0C0000 | 7 | 0 | 0 | C | 0 | 0 | 0 | 0 | 4 | 262 |
| (015) | 1 | 0x0 | 0x5 | 2 | 0 | 5 | C | 4 | 4 | 0 | 1 | 5 | |
| (016) | 1 | 0x1 | 0x0005C440 | 9 | 4 | 0 | 0 | 1 | 9 | 2 | 0 | 0 | |
| (017) | 1 | 0x2 | 0x0019 | 5 | 6 | 0 | 0 | C | 0 | 0 | 0 | 2 | 263 |
| (019) | 1 | 0x4 | 0x0C0002 | 7 | 0 | 6 | 5 | C | 0 | 0 | 0 | 1 | |
| (015) | 1 | 0x0 | 0x6 | 2 | 0 | 3 | 0 | 0 | 0 | 0 | 2 | 0 | |
| (032) | 2 | 0x1 | 0x0065C000 | 9 | 0 | 4 | 4 | 0 | 0 | 0 | 0 | 0 | 264 |
| (033) | 2 | 0x2 | 0x0000 | 5 | 2 | 1 | 8 | 0 | C | B | 8 | 0 | |
| (034) | 2 | 0x3 | 0x000000 | 7 | 0 | 6 | 0 | 6 | 2 | 2 | 8 | 0 | |
| (035) | 2 | 0x4 | 0xCB8004 | 7 | 5 | B | 0 | 0 | 0 | B | 3 | 0 | |
| (015) | 2 | 0x0 | 0x8 | 2 | 0 | 8 | 0 | 0 | C | 0 | 0 | 4 | 265 |
| (002) | 0 | 0x1 | 0x2802 | 5 | 0 | 0 | 0 | 0 | 1 | 9 | 5 | 2 | |
| (003) | 0 | 0x2 | 0x00606 | 6 | 0 | 5 | 8 | 1 | 4 | 3 | 1 | 7 | |
| (004) | 0 | 0x3 | 0x5B000B | 7 | 3 | 0 | 0 | 0 | 0 | 2 | 0 | 0 | |
| (005) | 0 | 0x4 | 0x20800C00 | 9 | 9 | 4 | 0 | 1 | 1 | 2 | 1 | 6 | 266 |
| (006) | 0 | 0x5 | 0x00019 | 6 | 4 | C | 0 | 0 | B | 1 | 0 | 4 | |
| (001) | 0 | 0x0 | 0x7 | 2 | 2 | 0 | 8 | 3 | 3 | C | 0 | 0 | |
| (048) | 3 | 0x1 | 0x00058143 | 9 | C | 0 | 1 | 1 | 4 | 9 | 7 | 0 | 267 |
| (049) | 3 | 0x2 | 0x0000 | 5 | 0 | 8 | 6 | 6 | C | 0 | 0 | 4 | |
| (050) | 3 | 0x3 | 0x011216 | 7 | | | | | | | | | |
| (051) | 3 | 0x4 | 0x0B1049 | 7 | | | | | | | | 268 | |
| (015) | 3 | 0x0 | 0xC | 2 | | | | | | | | | |
| (005) | 0 | 0x4 | 0x20833C00 | 9 | | | | | | | | | |
| (001) | 0 | 0x0 | 0x7 | 2 | | | | | | | | | |
| (056) | 3 | 0x9 | 0x114 | 4 | | | | | | | | | |
| (015) | 3 | 0x0 | 0xC | 2 | | | | | | | | | |

FIG. 6

PROCESSOR HAVING A REGISTER FILE, PROCESSING UNIT, AND INSTRUCTION SEQUENCER, AND OPERABLE WITH AN INSTRUCTION SET HAVING VARIABLE LENGTH INSTRUCTIONS AND A TABLE THAT MAPS OPCODES TO REGISTER FILE ADDRESSES

CROSS-REFERENCE TO RELATED APPLICATIONS

This application claims the priority under 35 U.S.C. § 119 of European Patent application no. 21170273.3, filed on 23 Apr. 2021, the contents of which are incorporated by reference herein.

FIELD

The disclosure relates to a processor, and more particularly to an instruction set for a processor.

BACKGROUND

Machine learning algorithms, including those based on artificial neural networks (ANNs), have a wide range of applications. A number of specialised accelerators have been devised that enable acceleration of ANNs, including Qualcomm's Hexagon 685 DSP (in Snapdragon 845), Hactar and Yemen from ARM, and Google's stand-alone Tensor processor. These implementations typically target high performance. Available ANN accelerators focus on high-end applications like generic Deep Learning, computer vision, speech recognition, etc. These chips typically consist of DSP-like high-speed accelerators to improve execution speed well above that of high-end application processors or multicore server processors.

There are a number of applications for machine learning, for example based on ANNs, where energy use and/or memory footprint is highly constrained. An example is in Human Machine Interfaces (HMI). The evolution of HMI to more natural user interfaces may require the use of complex algorithms which must achieve high accuracy rates. In many cases, such natural HMI are required to run on wearable devices in which energy consumption is a major concern. These algorithms are used to perform tasks such as voice recognition, gesture recognition, eye tracking or proximity touch and are being required by more and more applications.

Most of these systems use data from inertial sensors, cameras or microphones as input data and the classification can be divided into two parts: the feature extractor and the classifier. Examples for feature extractors are edge detection, corner detection or thresholding while examples for classifiers are decision tree, Naive Bayes, neural nets, or SVM. It is in general a very hard task to decide upon the best feature extractors to obtain the relevant information from the input data. In this context, machine learning algorithms are a very attractive solution since the extraction of relevant information and the classification strategy are totally learned by the algorithm during the training phase.

Low-power embedded acceleration may be highly desirable for many smart wearables and autonomous IoT devices. An accelerator architecture that is suitable for implementation in microcontrollers for improving machine learning (e.g. for context classification) is desirable.

SUMMARY

According to first aspect, there is provided a processor comprising:
  a register file comprising a plurality of register file addresses;
  a processing unit, configured to perform processing in accordance with a configuration defined by information stored in the register file;
  an instruction sequencer, configured to control the processing unit by:
    retrieving a sequence of instructions from a memory, wherein each instruction comprises an opcode and a subset of the instructions further comprise a data portion; and
    for each instruction in the sequence of instructions, performing an action defined by the opcode,
  wherein the action for the subset of the opcodes comprises writing the data portion to a register file address defined by the opcode; and
  the sequence of instructions comprises variable length instructions.

The length of the data portion may be determined dependent on the opcode.

The processor may comprise a table that maps at least some of the opcodes to specific register file address locations. The processor may comprise a table that defines the length of the data portion based on the opcode.

The configuration defined by the information stored in the register file may comprise a plurality of configuration parameters. At least one register file address may comprise more than one configuration parameter. At least one configuration parameter may reside on more than one register file address.

The table may comprise a plurality of banks, each bank defining a different mapping of opcodes to specific register file address locations, and the action for at least one of the opcodes may comprise an instruction to switch banks.

The banks may comprise at least one of:
  i) a first bank comprising convolution instructions;
  ii) a second comprising input memory instructions for reading input data;
  iii) a third bank comprising kernel memory instructions for reading kernel data; and
  iv) a fourth bank comprising output memory instructions for writing output data.

The register file may comprise a plurality of configurations for the processing unit and define which of the plurality of configurations should be used by the processing unit. This enables, for example, interleaving of two (or more) different types of processing operation performed by the processing unit with minimal changes to the register file, and consequently keeps the sequence of instructions small.

The opcode may be of fixed length. For example, the opcode may be 1 nibble (or 4 bits).

The processor may be configured to use bits of the data portion as conditions for operations on parameters defined by the register file.

The register file may define memory access operations to be performed by the processor.

The processing unit may be configured to perform hardware accelerated convolution operations.

The register file may define at least one of:
  i) a type of convolution operation to be performed by the processing unit;
  ii) an input data format for the convolution operation;
  iii) an output data format for the convolution operation;

iv) whether a rectification operation should be performed after the convolution operation;
v) whether a pooling operation should be performed; and
vi) scaling of kernel weights.

The register file may comprise address locations dedicated to at least one of:
i) direct memory access operations for reading input data;
ii) direct memory access operations for reading kernel data;
iii) direct memory access operations for writing output data.

The processor may further comprise a slave port, for writing data to the register file, wherein the slave port provides a fixed data-path width.

The register file may comprise a plurality of flip-flops that implement the configuration or configuration parameters. The register file may subsequently be specified using a high level digital design language, so that the approach is not specific to a particular manufacturing technology (because the specification of the register file can readily be translated to a process specific layout via synthesis into a netlist of standard cells).

According to a second aspect, there is provided a method of compiling a program for a processor according to the first aspect, the method comprising:
analysing a sequence of operations to be performed by the processing unit,
determining which of a plurality of configuration parameters defined by the register file change between successive operations;
defining a sequence of instructions for performing the sequence of operations, wherein the sequence of instructions updates only the configuration parameters that change between each operation.

The sequence of instructions may be selected so that, for each operation, the instructions with the shortest length are selected to update the configuration parameters. For example, there may be a first opcode that maps to a register file address that defines a first parameter and second parameter, and a second opcode that maps to a register file address that defines only a first parameter, and consequently has a shorter data portion than the first register file. If only the first parameter needs to be changed, the first opcode may be selected, since this has the shorter instruction length.

According to a third aspect, there is provided a method for operating a processor comprising:
reading an sequence of instructions, each instruction comprising an opcode and wherein a subset of the instructions further comprising a data portion; and
for each instruction in the sequence performing an action defined by the opcode;
wherein the action for the subset of the instructions comprises writing the data portion to a register file address defined by the opcode; and
wherein the sequence of instructions comprises variable length instructions.

The length of the data portion may be determined dependent on the opcode.

The method may comprise using a table to map at least some of the opcodes to specific register file address locations.

Each register file address may define one or more configuration parameters defining actions to be performed by the processor. Each configuration parameter may reside on more than one register file address.

The table may comprise a plurality of banks, each bank defining a different mapping of opcodes to specific register file address locations, and the action for at least one of the opcodes may comprise an instruction to switch banks.

The banks may comprise at least one of:
i) a bank consisting of convolution instructions;
ii) a bank consisting of input memory instructions for reading input data;
iii) a bank consisting of kernel memory instructions for reading kernel data; and
iv) a bank consisting of output memory instructions for writing output data.

The opcode may be of fixed length. For example, the opcode may be 1 nibble (or 4 bits).

The register file may define memory access operations to be performed by the processor.

The processor may comprise a processing unit configured to perform hardware accelerated convolution operations in accordance with the configuration parameters.

The register file may define at least one of:
i) a type of convolution operation to be performed by the processing unit;
ii) an input data format for the convolution operation;
iii) an output data format for the convolution operation;
iv) whether a rectification operation should be performed after the convolution operation;
v) whether a pooling operation should be performed; and
vi) scaling of kernel weights.

The register file may comprise address locations dedicated to at least one of:
i) direct memory access operations for reading input data;
ii) direct memory access operations reading kernel data;
iii) direct memory access operations for writing output data.

According to a fourth aspect, there is provided a non-transitory machine readable storage medium, comprising:
a sequence of instructions, each instruction comprising an opcode and a subset of the instructions further comprising a data portion; and
wherein the opcode of each instruction defines an action to be performed by a processor, and the action for the subset of the instructions comprises writing the data portion to a register file address defined by the opcode; and
wherein the sequence of instructions comprises variable length instructions.

The medium of the fourth aspect may include instructions for configuring a processor to perform a method in accordance with the third aspect, including any of the optional features of the third aspect (and/or first aspect).

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

DETAILED DESCRIPTION OF EMBODIMENTS

Figure 1:
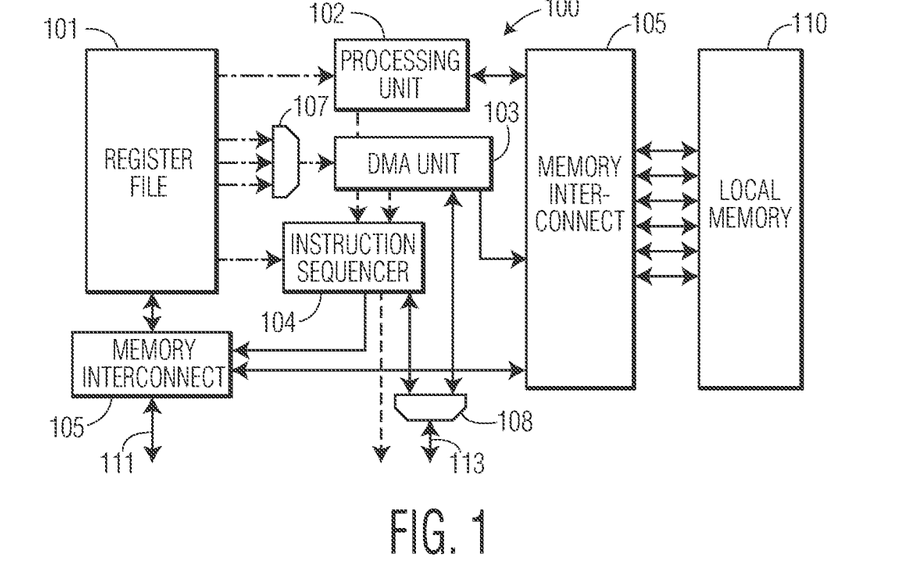
FIG. 1 is a schematic block diagram of a processor according to an embodiment.

Referring to FIG. 1, a block diagram of a processor 100 is shown. The processor 100 may be implemented as an embedded application specific signal processing element (e.g. a neural processing unit, NPU) within a more complex host microcontroller or microprocessor architecture. The processor 100 comprises: register file 101, processing unit 102, direct memory access (DMA) unit 103, instruction sequencer 104, memory interconnect 105, local memory 110, slave port 111 and master port 113.

The processing unit 102 is configured to perform application specific operations such as convolutions, matrix multiplications and vector operations, and may comprise a plurality of multiply accumulator units (MAC units).

The DMA unit 103 is configured to directly access data from a memory subsystem that is not part of the processor 100. In the context of the processor 100 being implemented as part of a microcontroller the DMA unit 103 may allow autonomous access to system memory of the microcontroller, enabling streaming of data into and out of the processor 100 without burdening the host processor of the microcontroller.

The register file 101 configures and controls the processor 100 in accordance with the data stored therein.

The instruction sequencer 104 is configured to fetch and schedule a list of commands for execution by the processor 100, which may include DMA operations, convolutions performed using the processing unit 102, etc.

The local memory 110 is configured to provide local storage, for example of partial computation results. Providing local storage may speed up reading and writing of information, and reduce the burden on a system within which the processor 100 is embedded.

The slave port 111 provides direct access to the register file 101 for a host processor, which enables the host processor to directly control the processor 100. The slave port 111 also provides direct access to the local memory 110 for the host processor.

The master port 113 provides access to the system memory via the DMA unit 103 for the instruction sequencer 104, to enable an autonomous operation mode of the processor 100 (which may enable the host processor to be put into a low power mode). For fetching instructions, the instruction sequencer 104 drives/uses the master port 113. The master port 113 also allows access to system memory for transferring data between system memory and local memory 110 (driven by the DMA unit 103). The arbiter (multiplexer) 108 resolves access conflicts between the instruction sequencer and the DMA unit 103.

The memory interconnect 105 enables communication between the slave port 111, DMA unit 103, processing unit 102, local memory 110, and register file 101.

The arrows among the components of the processor 100 can be grouped into:
  i) data signals (shown as solid lines), consisting of read/write data signals, address signals, and access control signals;
  ii) control signals (shown as dashed-dotted lines), consisting of signals for parameter settings and execution control; and
  iii) synchronization signals (showed as dashed lines), for controlling the order to execution between the DMA unit 103 and processing unit 102.

The operation of each subsystem/module will be described in more detail below.

Processing Unit

The processing unit 102 may perform hardware accelerated processing (e.g. convolutions) and may be implemented as a state-machine. The processing unit 102 may comprise loop iterators with loop-bounds defined in the register file 101 as programmable parameters. The processing unit 102 is configured to read data from local memory 110 and perform computations on dedicated processing elements (for example, a systolic array of MAC units). The subsequently computed results are stored by the processing unit 102 on the local memory 110. The processing unit 102 may comprise multiple ports (e.g. four 32-bit ports) to increase bandwidth between the processing unit 102 and local memory 110.

The processing unit may be configured to operate using 16-bit precision fixed integer arithmetic. The local memory 110 may be configured to store 32-bit words, so that every operation accessing the local memory 110 permits processing of two data/kernel weight points, which translates into a reduced memory bandwidth requirement.

In some embodiments, the processing unit 102 may be configured to execute 2D convolutions, in which 2D input maps (i.e. input matrices of data) are convolved with 2D kernels to produce an output map. The processing unit may also be configured to perform a sum of 2D convolution operations, computed using the formula:

$$O(k, l) = \sum_{p=1}^{P}\sum_{m=1}^{M}\sum_{n=1}^{N} W(p, m, n) * I(p, k+m-1, l+n-1) + b$$

where M and N are the number of rows and columns of the convolution kernel(s), P is the number of input maps (matrices), I refers to the input map(s), and W to the kernel(s). The term b is the bias. The data entries in O, W, I and b may be fractional fixed-point numbers in the range [−1,1].

The processing unit may optionally be configured with at least one of:
  a) signed or unsigned two's-complement input data format;
  b) signed or unsigned two's-complement output data format;
  c) a rectification operation, such as the ReLU (rectified linear unit) operation, which saturates negative output numbers to zero;
  d) a pooling operation, for example max-pooling, which reduces the dimensionality of the output map by a factor Sr and Sc in the row and column direction, according to:

$$O'(k, l) = \max_{\substack{r \in \{0...Sr-1\} \\ c \in \{0...Sc-1\}}} O(k*Sr + r, l*Sc + c)$$

e) scaling of the kernel weights, for example by a power of 2, according to:

$$W'(m,n) = 2^{-s} * W(m,n), s = 0 \ldots 7$$

Where W is the input weight-matrix, s is the scale parameter, and W' is the effective weight-matrix. By applying scaling, a higher accuracy (up to n=7 bits) can be realized in case the entries in the effective weight matrix W' are small (smaller than 0.5). Each kernel may comprise a dedicated scaling parameter:

f) scaling of the output by a power of 2, according to:

$$O'(k,l)=2^{-n}*O(k,l), n=0\ldots 7$$

Where, O is the computed output matrix, n is the output scale parameter, and O' is the resulting output-matrix. By applying output scaling, the processing unit 102 can return values in the range [−128,128]. The processor 102 may have a configurable parameter for the purpose of output scaling.

Figure 2:
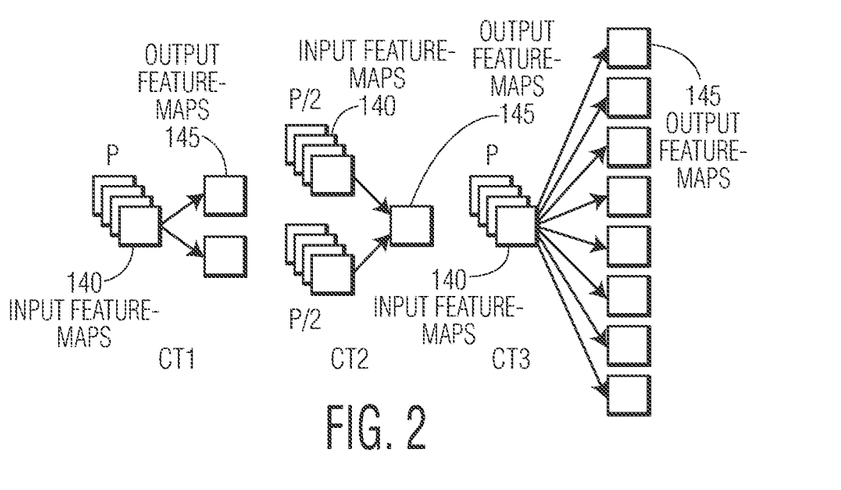
FIG. 2 shows three types of convolution that may be implemented in certain embodiments.

The processing unit 102 may be configured to compute the convolution in different modes. The modes may comprise CT1, CT2 and CT3 modes, as depicted in FIG. 2.

In CT1 mode, the processing unit 102 computes two output feature-maps 145 per invocation in parallel based on P input feature-maps 140. Each output feature map 145 is the sum of 2D convolutions based on the P input feature-maps whereby the kernel per combination of input and output feature-map is different. In embodiments in which the number of bits of precision of the processing unit 102 is half the number of bits per word in the local memory, the kernel data may be packed in pairs at shared local memory addresses. Each address storing kernel data in the local memory may thereby store a 16-bit weight for both a first kernel and a second kernel (respectively corresponding with a first and second output feature-map 145).

In CT2 mode, the processing unit 102 computes one output feature-map 145 per invocation, from the sum of 2D convolutions performed using two different kernels on P input feature maps. The two kernels may be packed in shared memory addresses (as described with reference to the CT1 operation).

In CT3 mode, the processing unit 102 computes eight output feature-maps 145 per invocation, from the sum of 2D convolutions performed using eight different kernels on P input feature maps 140. The eight kernels may be packed in 4 memory blocks, where each block contains 2 kernels (e.g. where the kernels are n-bit, and each memory address comprises a 2n-bit word).

Register File

The register file 101 embodies the configuration parameters for the processor 100. The register file 101 may control the processing unit 102 and DMA unit 103 via dedicated control lines, based on the data stored in the register file 101. The register file 101 can be accessed (for read and write) from the slave port 111 via the memory interconnect 105, and by the instruction sequencer 104 when executing a sequence of instructions (which may be retrieved from system memory). For write access, the slave port 111 may have priority over the instruction sequencer 104, which means that in the case of simultaneous write-access from both the slave port 111 and instruction sequencer 104, the instruction sequencer 104 will be put on-hold for one clock cycle.

In an example embodiment, the register file 101 may comprise 64 register addresses that each store a data word with up to 32 bits. Each address of the register file 101 may control specific aspects of the processor 100.

An example allocation of some register file addresses used for convolution configuration is shown below in Table 1.

TABLE 1 example register file definitions used for convolution configuration

| ADD | REG | FIELD | BITS | MSB | LSB |
|---|---|---|---|---|---|
| 0x1 | CONV_START | instr_bank (*) | 2 | 1 | 0 |
| | | conv_start_abort | 1 | 2 | 2 |
| | | RFU | 29 | 31 | 3 |
| 0x2 | CONV1 | unsigned_in | 1 | 0 | 0 |
| | | unsigned_out | 1 | 1 | 1 |
| | | output_scaling | 3 | 4 | 2 |
| | | addr_remap_mode | 1 | 5 | 5 |
| | | opcode | 3 | 8 | 6 |
| | | omit_output | 2 | 10 | 9 |
| | | max_pooling | 2 | 12 | 11 |
| | | relu | 1 | 13 | 13 |
| | | dilation | 2 | 15 | 14 |
| | | RFU | 16 | 31 | 16 |
| 0x3 | CONV2 | kernel_num_rows_m1 | 7 | 6 | 0 |
| | | RFU | 1 | 7 | 7 |
| | | kernel_num_cols_m1 | 7 | 14 | 8 |
| | | num_maps_m1 | 5 | 19 | 15 |
| | | RFU | 12 | 31 | 20 |
| 0x4 | CONV3 | row_stop_m1 | 8 | 7 | 0 |
| | | col_start | 8 | 15 | 8 |
| | | col_stop_m1 | 8 | 23 | 16 |
| | | RFU | 8 | 31 | 24 |
| 0x5 | CONV4 | input_base | 9 | 8 | 0 |
| | | swap_input_tiles | 1 | 9 | 9 |
| | | ms_init | 1 | 10 | 10 |
| | | ms_end | 1 | 11 | 11 |
| | | kernel_base | 10 | 21 | 12 |
| | | output_base | 10 | 31 | 22 |
| 0x6 | CONV5 | input_row_offset | 8 | 7 | 0 |
| | | input_map_size | 9 | 16 | 8 |
| | | RFU | 15 | 31 | 17 |

In the above example, the conv_start_abort field may cause the processing unit 102 to start performing a convolution operation if the value of bit 2 at address 0x1 of the register file 101 is written '1', and may cause the processing unit 102 to abort processing an convolution operation if the value of bit 2 at address 0x1 is written '0'.

Similar allocations of data at specific register file addresses can be used to control the DMA unit 103.

In certain embodiments, the register file may not be implemented as a hard-macro (i.e. a specific layout, optimised for a specific IC manufacturing technology). Instead the register file may comprise flip-flops (or latches) that implement the configuration parameters and associated read-write access mechanism and optional operations on read-write access. An application specific structure may allow updating these parameters via the various addresses of the register file. The register file may be coded in Verilog/VHDL (or another high level digital design language) and synthesized into a netlist of standard cells (with the standard cells targeting a specific manufacturing technology).

Local Memory and Memory Interconnect

Figure 3:
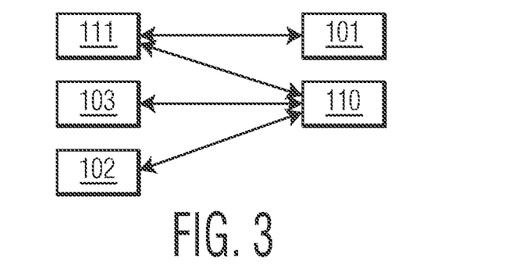
FIG. 3 is an illustration of memory connectivity provided by a memory interconnect.

The local memory 110 may store the input data, output data and coefficients (e.g. kernel weights) for the operations to be performed by the processing unit 102. The memory interconnect 105 provides connectivity as illustrated in FIG. 3, between the slave port 111, DMA unit 103 and processing unit 102, and the register file 101 and local memory 110.

The connection between the processing unit 102 and the local memory 110 may comprise multiple independent links which may be implemented by multiple ports (e.g. 4×32 bit ports).

The slave port 111 may address the register file 101 and the local memory 110 via a unified address space that covers both. The register file 101 may be addressed with the address range 0x000 to 0x13F, for example (an allocation of 320 words). The local memory 110 may comprise a plurality of data-buffers, for example 6 data-buffers, each storing 320 32-bit words. The data-buffers may be physically partitioned, but addressed using a continuous memory map. Buffer allocation may be different between different operation types performed by the processing unit 102, which may enable better space utilization and performance. In embodiments where the processing unit 102 operates at n-bit precision and the buffer stores 2n-bit words, a single buffer access permits processing of two data or kernel weight points.

DMA Unit

The DMA unit 103 allows for transferring between the local memory 110 and system memory, including via the master port 113, under the control of the register file 101 (which can be programmed by the slave port 111 or instruction sequencer 104). This enables autonomous loading and off-loading of data between system memory and local memory 110. The DMA unit 103 is configured to interoperate with the processing unit 102 so that data stored in the local memory 110 is in locations expected by the processing unit 102. The DMA unit 103 gets its configuration from one of 3 possible parameter sets that each reside in the register file 101. The selection of one out of these 3 sets is implemented by multiplexor 107. A parameter of the register file 101 controls the selection.

The DMA unit 103 may support multi-dimensional transfers (e.g. matrix and n-dimensional data sets). The DMA unit 103 may further support circular buffering and non-contiguous addressing between the system memory and the local memory 110.

Instruction Sequencer

The register file 101 allows programming of registers via n-bit words. For example, n may be 32, and the slave port 111 may subsequently program the register file 101 via 32-bit words, written to each address of the register file 101.

Figure 4:
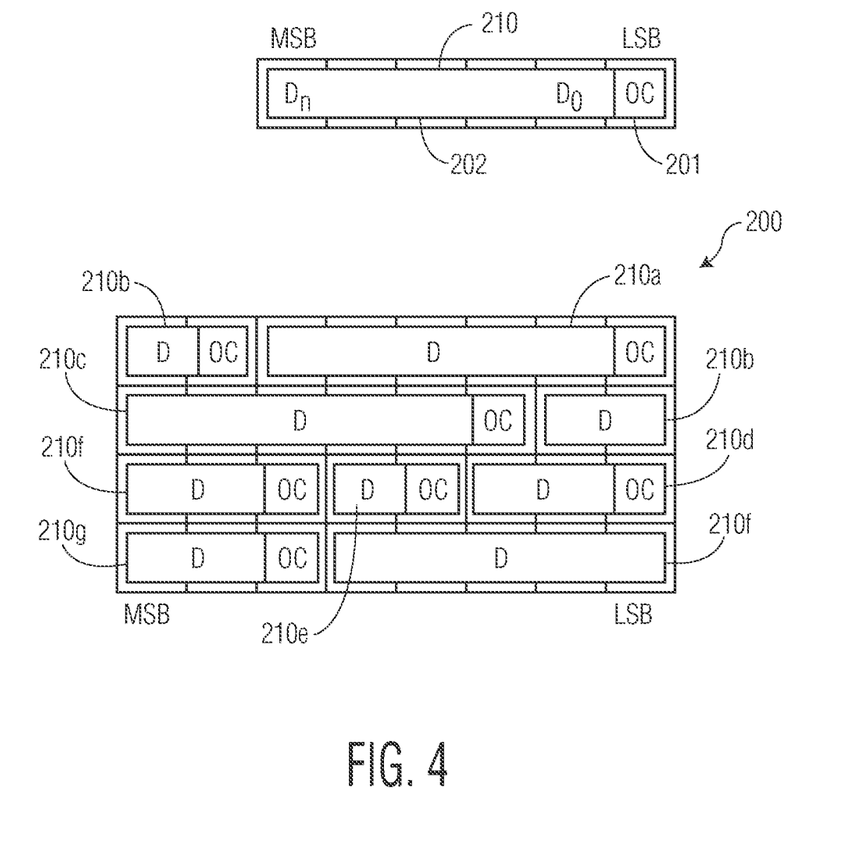
FIG. 4 is an example of a variable length instruction and a sequence of variable length instructions.

In order to reduce the program size for the instruction sequencer 104 and reduce transfer overhead, the instruction sequencer 104 may use variable length instructions.

first 6 nibbles of the first word. Instruction 201b occupies the last two (most significant) nibbles of the first word, and the first two (least significant) nibbles of the second word. As can be seen in FIG. 4, this approach allows more instructions to be packed into a given amount of memory than a fixed length approach (in which each data portion comprises a full 32-bit word of 8 nibbles).

The opcode 201 may map to a virtual address space, rather than a physical address of the register file 101. In an example embodiment, the register file 101 may have more register addresses (e.g. 64) than can be encoded in the opcode 201 (which may comprise a single nibble, encoding 16 different values). The opcode 201 may address a virtual address space that contains a pointer to the physical register file address space.

The mapping from the opcode to the register file 101 may be divided into banks, and at least one opcode value may switch the bank being addressed (e.g. to a bank value defined by the data portion 202, or the opcode may increment or decrement a bank value which may not require any data portion). In an example embodiment, the register file 101 may comprise 64 32-bit registers, divided over 4 banks, with bank 0 dedicated to processing unit operations and banks 1 to 3 to DMA operations. For example, bank 1 may relate to input DMA, bank 2 kernel DMA (or more generally to processing coefficient DMA), and bank 3 output DMA.

An advantage of having banks dedicated to different DMA operations is that interleaved operations may be mapped to an execution unit without updating all parameters between each operation. For example, the type of DMA operation may be specified next to the execute DMA instruction, and the appropriate parameters for that type of DMA instruction may remain mostly unchanged between operations.

The instruction set for the opcodes may comprise a table that maps the values of the opcode to a physical register file address location (or to another action, such as "end program"). An example mapping is shown below in Table 2.

TABLE 2

Opcode to register file address mapping

| | Op-Code | | | | | | | | | | | | | | | |
|---|---|---|---|---|---|---|---|---|---|---|---|---|---|---|---|---|
| BANK | 0 | 1 | 2 | 3 | 4 | 5 | 6 | 7 | 8 | 9 | A | B | C | D | E | F |
| 0 | | 1 | 2 | 3 | 4 | 5 | 6 | | | | | | | | | |
| 1 | | $\overline{15}$ | 16 | 17 | 18 | 19 | | | | 23 | 24 | | | | | |
| 2 | | $\overline{15}$ | 32 | 33 | 34 | 35 | | | | $\overline{39}$ | 40 | 41 | | | | |
| 3 | | $\overline{15}$ | 48 | 49 | 50 | 51 | | | | $\overline{55}$ | 56 | | | | 64 | EP |

FIG. 4 shows an example instruction 210, which comprises an opcode 201 and data portion 202. The opcode 201 may have fixed length (e.g. 1 nibble) and the data portion may be variable length (e.g. 0 to 8 nibbles).

The instruction is read from right to left (starting at the opcode 201). The least significant bit (LSB) of the data portion 202 $D_0$ is closest to the opcode 201, and the most significant bit of the data portion 202 $D_n$ is furthest from the opcode 201. An example program layout 200 is shown, comprising a sequence of variable length instructions 210a-g. In each case the processor 100 determines the length of the current instruction from the opcode 201. In the example program layout there are four 32-bit words of data (each word comprising 8 nibbles, each nibble comprising four bits, equivalent to one hex value). Instruction 201a occupies the Horizontally, the opcode is given (fixed length, 1 nibble), and vertically four banks are listed. The numbers in the centre of the table give the corresponding register file addresses for each combination of opcode and bank ID.

At any time, one of the four banks is active. The underlined register file addresses allow for switching the bank ID (potentially at the same time as changing other parameter settings, or commanding execution of DMA operations or compute operations using the processing unit 102). The opcode=F, bank ID=3 indicates an end-of-program instruction (EP), which results in termination of the instruction sequencing operation.

A second table may be used by the instruction sequencer 104 to determine the length of each of the variable length instructions in fetched program code (e.g. from system memory) enabling it to be divided into the variable length instructions. An example of such a table is shown below in Table 3, in which the data portion of each instruction comprises 0 to 8 nibbles and the opcode is a fixed length single nibble.

TABLE 3

Opcode to instruction length (opcode + data) mapping

| BANK | Op-Code | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 2 | 5 | 6 | 7 | 9 | 6 | | | | | | | | | | |
| 1 | 2 | 9 | 5 | 7 | 7 | | | | 9 | 2 | | | | | | |
| 2 | 2 | 9 | 5 | 7 | 7 | | | | 9 | 4 | 4 | | | | | |
| 3 | 2 | 9 | 5 | 7 | 7 | | | | 9 | 4 | | | | | 9 | 1 |

The above table defines the length of the instruction (in nibbles) for each combination of opcode and bank ID. Note that the length of the instruction in this example table comprises the fixed length 1 nibble opcode, and the variable length data portion. Note that the data portion does not have to be present for all opcodes. For example, the end-program opcode does not include a data portion.

From Table 3 it can be seen that only 8 of the 31 instructions use the full 32 bits (8 nibbles) of data. This considerably reduces the amount of memory that the instruction sequencer program occupies.

Furthermore, both Table 2 and Table 3 include special instructions (in bold) that reduce program size significantly by writing the data portion to more than one configuration parameter for the processing unit 102 and/or DMA unit 103. In some embodiments, different combinations of configuration parameters can be updated with information from different bits of the data portion of a single instruction. In some embodiments, different bits of the data portion can be used to update different configuration parameters. In some embodiments, bits of the data portion can be used as conditions for operations on register parameters/data (e.g. IF WD[0]==1, THEN Pa:=P2, or IF WD[0]==1, P1:=P1+P2).

Figure 5:
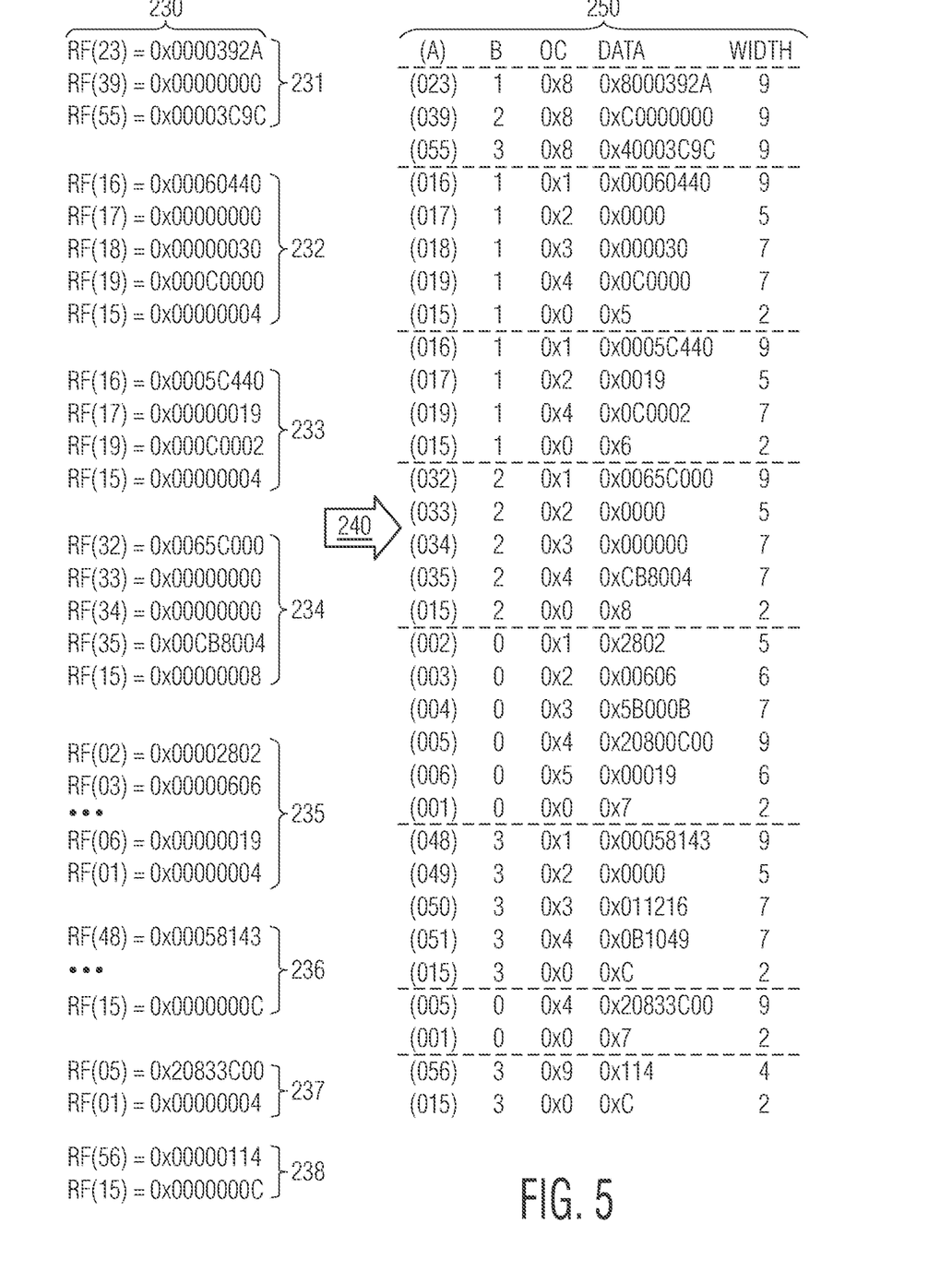
FIGS. 5 and 6 illustrate the translation of a set of fixed length instructions (32 bit 32-bit write operations) into a set of variable length instructions for an instruction sequencer.
Figure 6:
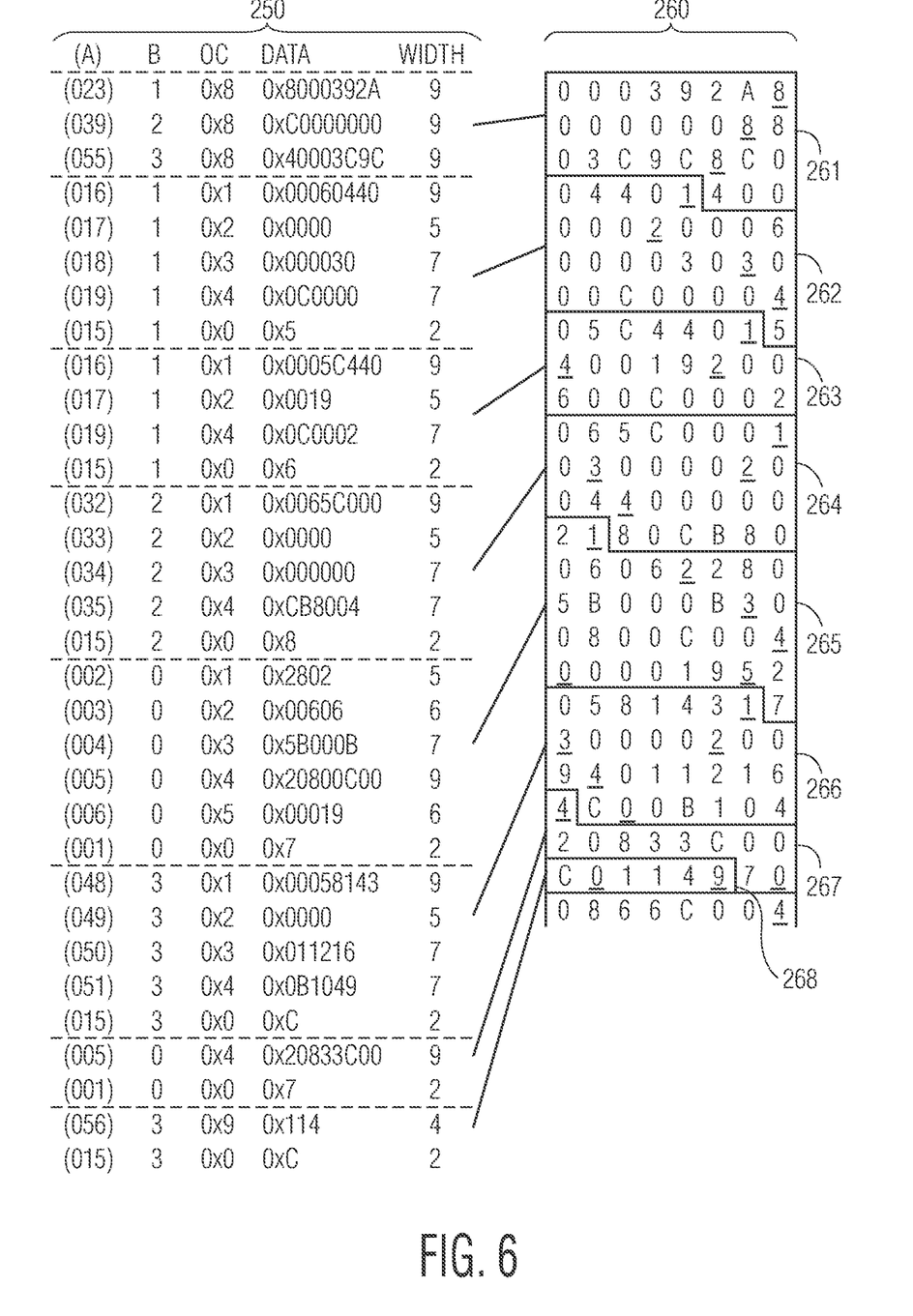

FIGS. 5 and 6 illustrate an example program excerpt 230 for controlling the processor 100 via the slave port 111, and an instruction sequencer program 260 packed into memory (along with a translated set of instructions).

The program excerpt 230 lists the register file address RF(n) and the values to be written (expressed as hex, as indicated by the prefix "0x"). The first group of instructions 231 set segment offset addresses for direct memory access to and from system memory. The second group of instructions 232 comprise DMA input instructions, which instruct the DMA unit 103 to read information from system memory to the local memory 110. The third group of instructions 233 is similarly a DMA input operation. The fourth group of instructions 234 is a kernel DMA operation. The fifth group of instructions 235 instructs the processing unit 102 and defines a convolution operation. The sixth group of instructions 236 is a DMA output operation (e.g. for writing a feature map from local memory 110 to system memory). The seventh and eighth groups of instructions 237, 238 are convolution operations and DMA output operations.

Under control from the slave port 111, each instruction to the processor 100 is of fixed length. A specific address location of the register file 101 is addressed with a 32-bit word by each instruction from the slave port 111.

FIG. 5 shows how the instructions in excerpt 230 can be translated/compiled 240 into variable length instructions for the instruction sequencer 104. This is illustrated in table 250, which lists the opcodes and equivalent data portions to achieve the same result as the slave port codes 230. The values of the data portion for each translated instruction is not necessarily the same as the values that would be written via the slave port 111. For example, the opcode=0 with bank ID=1 controls (e.g. instructs or aborts) execution of a DMA operation and also switching of bank ID (responsive to the data portion values). At the end of instruction groups 231 and 232 the values following opcode 0 (mapping to register file address location 15) are different in table 250 (compared with excerpt 230) depending on the subsequent desired value of bank ID for the following instruction.

Following translation into opcodes and data portions, the sequence of variable length instructions 250 is packed into a contiguous sequence 260 for writing to memory (e.g. system memory). In the packed sequence of instructions 261-268, the opcodes are underlined. Lines are used to show the original groups of instructions 231-238. 27 write operations are translated into 24 words of program code.

The packed sequence of instructions 260 takes a relatively small amount of memory, and enables autonomous control of the processor 100 while consuming a minimum amount of memory and system resources.

Compilation

A program for the instruction sequencer 104 may be compiled for efficient execution by analysing which register parameters are modified between successive DMA or processing (e.g. convolution) operations. Typically only a subset of parameters need to be updated between successive DMA or processing (e.g. convolution) operations. The most efficient instructions from the instruction set can be selected to perform those updates, and the relevant opcodes and data portions generated. Having three independent DMA parameter sets for input, output and kernel data transfer are advantageous in reducing the number of instructions required for a given program.

The variable length instruction set described herein, along with the register controlled processing unit, combine to enable application specific processing that is capable of autonomous operation with minimal memory requirements, rendering it highly suitable for applications in microcontrollers. Embodiments may be useful in natural human machine interfaces, for example keyword waking, voice command recognition, gesture based input, movement recognition/tracking etc. More generally, the approach outlined herein may be applicable in any application employing an application specific processor.

The programming of the processor 100 is highly flexible, but is at a relatively low level of abstraction. In a host processor, a hardware abstraction layer may be provided between the processor 100 and the application (or API calls) to ease programming and use of the processor 100. The low level details discussed herein may therefore be substantially hidden for the host application.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

From reading the present disclosure, other variations and modifications will be apparent to the skilled person. Such variations and modifications may involve equivalent and other features which are already known in the art of memory systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A processor comprising:
a register file comprising a plurality of register file addresses, the plurality of register file addresses divided into a plurality of banks;
a processing unit, configured to perform processing in accordance with a configuration defined by information stored in the register file; and
an instruction sequencer, configured to control the processing unit by:
retrieving a sequence of instructions from a memory, wherein each instruction comprises an opcode, and a subset of the instructions each further comprise a data portion; and
for each instruction in the sequence of instructions, performing an action determined at least in part by the opcode,
wherein the action for each instruction of the subset of the instructions comprises writing the data portion to a register file address determined by the opcode and an active bank of the plurality of banks; and
the sequence of instructions comprises variable length instructions,
wherein the processor comprises a table that maps at least some of the opcodes to specific register file addresses, wherein the table identifies the plurality of banks, each bank defining a different mapping of opcodes to specific register file addresses, and the action for at least one of the opcodes comprises switching banks.

2. The processor of claim 1, wherein, for each instruction of the subset of the instructions, a length of the data portion is determined dependent on the opcode.

3. The processor of claim 1, wherein the information stored in the register file comprises a plurality of configuration parameters and:
at least one register file address comprises more than one configuration parameter; and/or
at least one configuration parameter resides on more than one register file address.

4. The processor of claim 1, wherein the banks comprise at least one of:
i) a first bank for mapping opcodes related to convolution operations;
ii) a second bank for mapping opcodes related to input memory operations for reading input data;
iii) a third bank for mapping opcodes related to kernel memory operations for reading kernel data; or
iv) a fourth bank for mapping opcodes related to output memory operations for writing output data.

5. The processor of claim 1, wherein the information stored in the register file comprises a plurality of configuration parameters wherein at least one configuration parameter resides at more than one register file address.

6. The processor of claim 1, wherein the processing unit or a DMA unit of the processor is configured to use bits of the data portion as conditions for operations on parameters defined by the register file.

7. The processor of claim 1, wherein the register file defines memory access operations to be performed by a DMA unit.

8. The processor of claim 1, wherein the processing unit is configured to perform hardware accelerated convolution operations.

9. The processor of claim 8, wherein the register file defines at least one of:
i) a type of convolution operation to be performed by the processing unit;
ii) an input data format for the convolution operation;
iii) an output data format for the convolution operation;
iv) whether a rectification operation should be performed after the convolution operation;
v) whether a pooling operation should be performed; or
vi) scaling of kernel weights.

10. The processor of claim 9, wherein the register file comprises addresses dedicated to at least one of direct memory access operations for reading input data, direct memory access operations for reading kernel data, or direct memory access operations for writing output data.

11. The processor of claim 1, wherein the register file comprises a plurality of flip-flops that implement configuration parameters.

12. The processor of claim 1, further comprising a slave port, for writing data to the register file, wherein the slave port provides a fixed data-path width.

13. A method of compiling a program for the processor according to claim 1, the method comprising:
analysing a sequence of operations to be performed by the processing unit,
determining which of a plurality of configuration parameters defined by the register file change between successive operations; and
defining the sequence of instructions for performing the sequence of operations, wherein the sequence of instructions updates only those configuration parameters of the plurality of configuration parameters that change between successive operations.

14. A method for operating a processor having a register file divided into a plurality of banks comprising:
reading a sequence of instructions, each instruction comprising an opcode and a data portion; and
for each instruction in the sequence performing an action determined at least in part by the opcode;
wherein the action for at least some instructions comprises writing the data portion to a register file address determined by the opcode and an active bank of the plurality of banks; and
using a table that maps at least some of the opcodes to specific register file addresses,
wherein the sequence of instructions comprises variable length instructions,
wherein the table identifies the plurality of banks, each bank defining a different mapping of opcodes to specific register file addresses, and the action for at least one of the opcodes comprises switching banks.

15. The method of claim 14, wherein a length of the data portion is determined dependent on the opcode.

16. A non-transitory machine readable storage medium, comprising:
a sequence of instructions capable of accessing a register file which is divided into a plurality of banks, each instruction comprising an opcode and a subset of the instructions further comprise a data portion; and
wherein the opcode of each instruction at least in part determines an action to be performed by a processor, and the action for the subset of the instructions comprises writing the data portion to a register file address determined by the opcode and an active bank of the plurality of banks; and
wherein the sequence of instructions comprises variable length instructions,
wherein the sequence of instructions is capable of accessing a table that maps at least some of the opcodes to specific register file addresses, wherein the table identifies the plurality of banks, each bank defining a different mapping of opcodes to specific register file addresses, and the action for at least one of the opcodes comprises switching banks.

* * * * *